Patented July 15, 1924.

1,501,275

UNITED STATES PATENT OFFICE.

MOSES L. CROSSLEY, OF SOMERVILLE, NEW JERSEY, ASSIGNOR TO CALCO CHEMICAL COMPANY, OF BOUNDBROOK, NEW JERSEY, A CORPORATION OF NEW JERSEY.

ESTER OF 6.8-DIMETHYL-2-PHENYLQUINOLINE-4-CARBOXYLIC ACID AND PROCESS OF PRODUCING THE SAME.

No Drawing.     Application filed December 29, 1920. Serial No. 433,960.

*To all whom it may concern:*

Be it known that I, MOSES L. CROSSLEY, a citizen of the United States, residing at Somerville, in the county of Somerset, State of New Jersey, have invented a new and useful Ester of 6.8-Dimethyl-2-Phenyl-quinoline-4-Carboxylic Acid and Process of Producing the Same, of which the following is a specification.

This invention relates to the manufacture of the ethyl ester of 6-8-dimethyl-2-phenylquinoline-4-carboxylic acid, the structural formula of which is as follows:

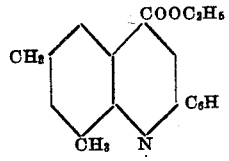

The new product may be obtained by esterification of the 6-8-dimethyl-2-phenyl-quinoline-4-carboxylic acid, for instance, in substantially the following manner. 50 parts of said acid are gradually added to a mixture of 25 parts of the $H_2SO_4$, 100% acid strength, and 300 parts of ethyl alcohol. The mixture is then heated whereupon, the yellow sulfate slowly dissolves. The solution is refluxed for about 20 hours and then about ⅔ of the alcohol is distilled off, preferably under diminished pressure. About 250 parts of benzene are added to the residue, resulting in the formation of a dark brown solution. This is poured into a litre of water at 40° centigrade, stirred thoroughly, and allowed to stand at about 20° C. for approximately 12 hours to insure complete hydrolysis of the sulfate of the ester. A small quantity of the 6-8-dimethyl-2-phenylquinoline-4-carboxylic acid separates and is filtered off. The solution is extracted with benzene and the benzene extract evaporated to a small volume and then cooled. The ester crystallizes out and is filtered and recrystallized several times from methyl alcohol.

The resulting product is a white crystalline substance, substantially devoid of taste, melting at about 91–92° centigrade, and is soluble in alcohol, ether and benzene. It forms salts with acids.

The novel product has pronounced therapeutic properties and is indicated in gout, articular rheumatism and kindred ailments.

Having thus fully described the invention, what I claim as new and desire to secure by Letters Patent is:

1. The process of producing the ethyl ester of 6-8-dimethyl-2-phenylquinoline-4-carboxylic acid, which consists in commingling substantially 50 parts of the said acid with a mixture of approximately 25 parts of sulphuric acid of a strength of about 100% acid, and substantially 300 parts of ethyl alcohol, heating the resulting mixture, then refluxing it for the desired time, distilling a portion of the alcohol, adding benzene to the residue, and then adding the mixture to water and allowing the mixture to stand cold until hydrolysis is completed, removing any resulting precipitate, extracting the solution with benzene and crystallizing out the ester from the benzene extract.

2. The process of producing the ethyl ester of 6-8-dimethyl-2-phenylquinoline-4-carboxylic acid, which consists in commingling substantially 50 parts of the said acid with a mixture of approximately 25 parts of sulphuric acid of a strength of about 100% acid, and substantially 300 parts of ethyl alcohol, heating the resulting mixture, then refluxing it for the desired time, distilling a portion of the alcohol, adding benzene to the residue, and then adding the mixture to water and allowing the mixture to stand cold until hydrolysis is completed, removing any resulting precipitate, extracting the solution with benzene, crystallizing out the ester from the benzene extract and purifying the resulting crystals.

3. The herein described chemical product consisting of an ester of 6-8-dimethyl-2-phenylquinoline-4-carboxylic acid, the same being a white crystalline substance, melting at approximately 91–92° centigrade, being soluble in alcohol, ether and benzene and forming salts with acids.

In testimony whereof, I have signed my name to this specification.

MOSES L. CROSSLEY.